US009787677B2

(12) United States Patent
Jung et al.

(10) Patent No.: US 9,787,677 B2
(45) Date of Patent: Oct. 10, 2017

(54) METHOD OF AUTHENTICATING CAN PACKETS USING MIXTURE OF MACS AND APPARATUS FOR IMPLEMENTING THE SAME

(71) Applicants:Hyundai Motor Company, Seoul (KR); Kia Motors Corporation, Seoul (KR); Industry-Academic Cooperation Foundation, Chosun University, Gwangju (KR); SNU R&DB Foundation, Seoul (KR)

(72) Inventors: Ho Jin Jung, Seoul (KR); Chung Hi Lee, Seoul (KR); Ho Yoo, Gyeonggi-Do (KR); Byoung Wook Lee, Seoul (KR); Hyun Soo Ahn, Seoul (KR); Ho Youn Kim, Seoul (KR); Young Sik Moon, Seoul (KR); Jun Young Woo, Seoul (KR); Young Sik Kim, Gwangju (KR); Kang Seok Lee, Gyeonggi-Do (KR); Jong Seon No, Seoul (KR)

(73) Assignees: Hyundai Motor Company, Seoul (KR); Kia Motors Corporation, Seoul (KR); SNU R&DB Foundation, Seoul (KR); Industry-Academic Cooperation Foundation, Chosun University, Gwangju (KR)

( * ) Notice: Subject to any disclaimer, the term of this patent is extended or adjusted under 35 U.S.C. 154(b) by 183 days.

(21) Appl. No.: 14/632,467

(22) Filed: Feb. 26, 2015

(65) Prior Publication Data
US 2016/0099939 A1    Apr. 7, 2016

(30) Foreign Application Priority Data
Oct. 2, 2014    (KR) .................. 10-2014-0133321

(51) Int. Cl.
*H04L 29/06* (2006.01)
*H04L 29/08* (2006.01)
(Continued)

(52) U.S. Cl.
CPC ........ *H04L 63/0876* (2013.01); *H04L 63/061* (2013.01); *H04L 63/08* (2013.01); *H04L 63/162* (2013.01); *H04W 80/02* (2013.01)

(58) Field of Classification Search
CPC ..... H04L 63/08; H04L 67/12; H04L 2209/84; H04L 2209/38; H04L 9/3242;
(Continued)

(56) References Cited

U.S. PATENT DOCUMENTS 6,959,384 B1 * 10/2005 Serret-Avila ............ G06F 21/64
713/161
8,627,073 B2    1/2014 Kherani et al.
(Continued)

FOREIGN PATENT DOCUMENTS

JP    2001-251296 A    9/2001
JP    2012-186635    9/2012
(Continued)

OTHER PUBLICATIONS

Bellare, Mihir, Roch Guérin, and Phillip Rogaway. "XOR MACs: New methods for message authentication using finite pseudorandom functions." Annual International Cryptology Conference. Springer Berlin Heidelberg, 1995.*
(Continued)

*Primary Examiner* — Michael Simitoski
(74) *Attorney, Agent, or Firm* — Mintz Levin Cohn Ferris Glovsky and Popeo, P.C.; Peter F. Corless (57) ABSTRACT

A method and apparatus for authenticating packets in a controller area network (CAN) are disclosed. The method includes transmitting messages using a mixture of message
(Continued)

authentication codes (MACs) in a controller area network (CAN). In addition, a first MAC is generated using a first message and the first MAC is divided into a first MAC part and a second MAC part. A second MAC is generated using a second message and the second MAC is divided into a third MAC part and a fourth MAC part. A linear operation is performed between the second MAC part and the third MAC part to generate a first authentication MAC. The first message is transmitted with the first MAC part and the second message is transmitted with the first authentication MAC.

29 Claims, 5 Drawing Sheets (51) Int. Cl.
*B60R 16/023* (2006.01)
*H04L 9/32* (2006.01)
*H04W 80/02* (2009.01)

(58) Field of Classification Search
CPC ..... H04L 9/3239; H04L 63/123; H04L 12/40; H04L 2012/40273; H04L 2012/40215; B60R 16/023; G06F 21/64; G06F 21/85
See application file for complete search history.

(56) References Cited

U.S. PATENT DOCUMENTS

| | | | | |
|---|---|---|---|---|
| 2008/0104397 | A1* | 5/2008 | Paddon | H04L 9/3242 713/168 |
| 2008/0222414 | A1* | 9/2008 | Wang | H04L 9/0643 713/161 |
| 2011/0051927 | A1* | 3/2011 | Murray | H04L 9/003 380/28 |
| 2012/0284523 | A1* | 11/2012 | Kolesnikov | H04L 9/0643 713/181 |
| 2014/0237251 | A1* | 8/2014 | Kaluzhny | H04L 63/123 713/176 |
| 2014/0310530 | A1* | 10/2014 | Oguma | H04L 9/3242 713/181 |
| 2015/0033016 | A1* | 1/2015 | Thornton | H04L 9/0825 713/171 |
| 2015/0089236 | A1* | 3/2015 | Han | H04L 9/3242 713/181 |
| 2015/0350241 | A1* | 12/2015 | Mayer | H04L 63/1441 726/3 |
| 2016/0026787 | A1* | 1/2016 | Nairn | G06F 13/4282 726/17 |
| 2016/0087791 | A1* | 3/2016 | Campbell | G09C 1/00 380/28 |
| 2016/0087798 | A1* | 3/2016 | Campbell | H04L 9/3242 713/181 |
| 2016/0191408 | A1* | 6/2016 | Yajima | H04L 12/4641 709/225 |
| 2016/0205194 | A1* | 7/2016 | Kishikawa | H04L 9/3242 726/1 |

FOREIGN PATENT DOCUMENTS

| | | |
|---|---|---|
| KR | 10-2005-0064343 | 6/2005 |
| KR | 10-2008-0093635 A | 10/2008 |
| KR | 10-0884488 | 2/2009 |
| KR | 10-2009-0085639 A | 8/2009 |
| KR | 10-2011-0057348 | 6/2011 |
| KR | 10-2014-0023799 | 2/2014 |
| WO | 2008/052137 A2 | 5/2008 |

OTHER PUBLICATIONS

Chen, Songqing, et al. "An application-level data transparent authentication scheme without communication overhead." IEEE Transactions on Computers 59.7 (2010): 943-954.*

Nilsson, Dennis K., Ulf E. Larson, and Erland Jonsson. "Efficient in-vehicle delayed data authentication based on compound message authentication codes." Vehicular Technology Conference, 2008. VTC 2008—Fall. IEEE 68th. IEEE, 2008.*

* cited by examiner

FIG. 1

RELATED ART

FIG. 2

RELATED ART

METHOD OF AUTHENTICATING CAN PACKETS USING MIXTURE OF MACS AND APPARATUS FOR IMPLEMENTING THE SAME

CROSS REFERENCE TO RELATED APPLICATION(S)

This application claims the benefit of Korean Patent Application No. 10-2014-0133321, filed on Oct. 2, 2014, which is hereby incorporated by reference as if fully set forth herein.

BACKGROUND

Field of the Invention

The present invention relates to a method for authenticating packets in a controller area network (CAN), and more particularly, to a more efficient authentication method using a mixture of divided message authentication codes (MACs) and an apparatus therefor.

Discussion of the Related Art

In a vehicle, data packet exchange between controllers is performed over a controller area network (CAN). In currently released vehicles, until recently, since an internal network of a vehicle operates independently of an external network, protection means (e.g., authentication) of internal network information of the vehicle has not been provided. Accordingly, due to the properties of a vehicle CAN using a broadcasting method, security technology for preventing information regarding a traveling vehicle from being stolen via a connection port for vehicle diagnosis or preventing malicious CAN packets from being inserted has not been provided.

Figure 1:
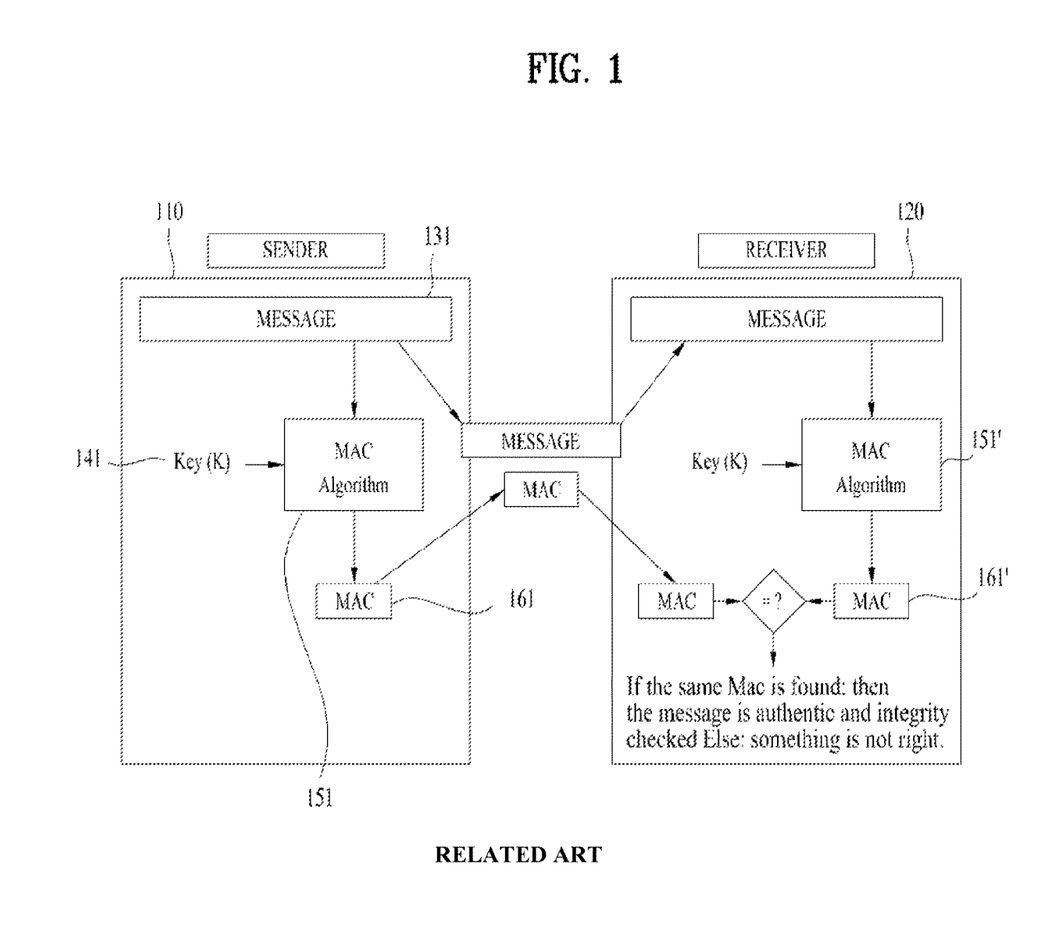
FIG. 1 is an exemplary diagram showing a MAC method according to the related art.

For security of a message in CAN packets, a message authentication code (MAC) method may be considered. The MAC refers to a minimal amount of information used for message authentication. The MAC method will be described with reference to FIG. 1. FIG. 1 shows an exemplary MAC method according to the related art.

FIG. 1 is illustrated under the assumption that a message 131 is transmitted from a sender 110 to a receiver 120. The sender and the receiver share a private key (K) 141 and a MAC generation algorithm (e.g., a MAC algorithm 151) in advance. In the sender 110, the private key 141 and the message 131 are input to the MAC algorithm 151 to generate a MAC 161 and the MAC is transmitted to the receiver 120 together with the message 131. In the receiver 120, the received message and the shared private key are input to a MAC algorithm 151' to calculate a MAC 161' and the calculated MAC 161' is compared with the received MAC 161 to verify integrity of the message.

Further, in the CAN, when the MAC method is used for security, a space in a CAN frame, into which MAC data for authentication is inserted, is lacking. More specifically, although data available in the CAN frame has a maximum of 64 bits, when general MAC data is inserted into the frame, the size of the CAN data inserted into the frame is reduced to less than half 64 bits. In addition, it may be difficult to apply the MAC method to an electronic apparatus sensitive to latency, such as a vehicle brake or an air bag.

SUMMARY

Accordingly, the present invention provides a method for authenticating packets in a controller area network (CAN) and an apparatus therefor that substantially obviate one or more problems due to limitations and disadvantages of the related art. An object of the present invention is to provide a more efficient MAC authentication method in a vehicle CAN and an apparatus therefor. Another object of the present invention is to provide a method of performing authentication using a minimal amount of MAC data and an apparatus therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting messages using a mixture of message authentication codes (MACs) in a controller area network (CAN) may include generating a first MAC using a first message, dividing the first MAC into a first MAC part and a second MAC part, generating a second MAC using a second message, dividing the second MAC into a third MAC part and a fourth MAC part, performing a linear operation between the second MAC part and the third MAC part to generate a first authentication MAC, transmitting the first message together with the first MAC part, and transmitting the second message along with the first authentication MAC.

In another aspect of the present invention, a controller for transmitting messages using a mixture of message authentication codes (MACs) in a controller area network (CAN) may include a message management module configured to generate a first message and a second message, an authentication module configured to generate a first MAC using the first message, to divide the first MAC into a first MAC part and a second MAC part, to generate a second MAC using the second message, to divide the second MAC into a third MAC part and a fourth MAC part, to perform a linear operation between the second MAC part and the third MAC part to generate a first authentication MAC, a transceiver module configured to transmit the first message along with the first MAC part and to transmit the second message along with the first authentication MAC.

In another aspect of the present invention, a method of receiving messages using a mixture of message authentication codes (MACs) in a controller area network (CAN) may include receiving a first frame that includes a first message and a first authentication MAC, calculating a first MAC using the first message, dividing the first MAC into a first MAC part and a second MAC part, comparing the first authentication MAC with the first MAC part to partially authenticate the first message, receiving a second frame that includes a second message and a second authentication MAC, calculating a second MAC using the second message, dividing the second MAC into a third MAC part and a fourth MAC part, performing a linear operation between the second MAC part and the second authentication MAC to calculate the third MAC part, and comparing the divided third MAC part and the calculated third MAC part to partially authenticate the second message.

In another aspect of the present invention, a controller for receiving messages using a mixture of message authentication codes (MACs) in a controller area network (CAN) may include a transceiver module configured to receive a first frame that includes a first message and a first authentication MAC and a second frame that includes a second message and a second authentication MAC, and an authentication module configured to calculate a first MAC using the first message, to divide the first MAC into a first MAC part and a second MAC part and to compare the first authentication MAC with the first MAC part to partially authenticate the first message, to calculate a second MAC using the second message, to divide the second MAC into a third MAC part and a fourth MAC part, to perform a linear operation between the second MAC part and the second authentication MAC to calculate the third MAC part, and to compare the divided third MAC part and the calculated third MAC part to partially authenticate the second message.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

A method of authenticating a CAN message according to the present invention will be described in greater detail with reference to the accompanying drawings. The suffixes "module" and "unit" of elements herein are used for convenience of description and thus can be used interchangeably and do not have any distinguishable meanings or functions. In general, when a MAC method is applied to a vehicle CAN, CAN data may be first transmitted and then MAC data of the CAN data may be transmitted. In particular, since a receiver may not authenticate the CAN data until the MAC data of the first received CAN data is received, latency may occur (e.g., a delay may occur in the authentication process). This will be described in greater detail with reference to FIG. 2.

Figure 2:
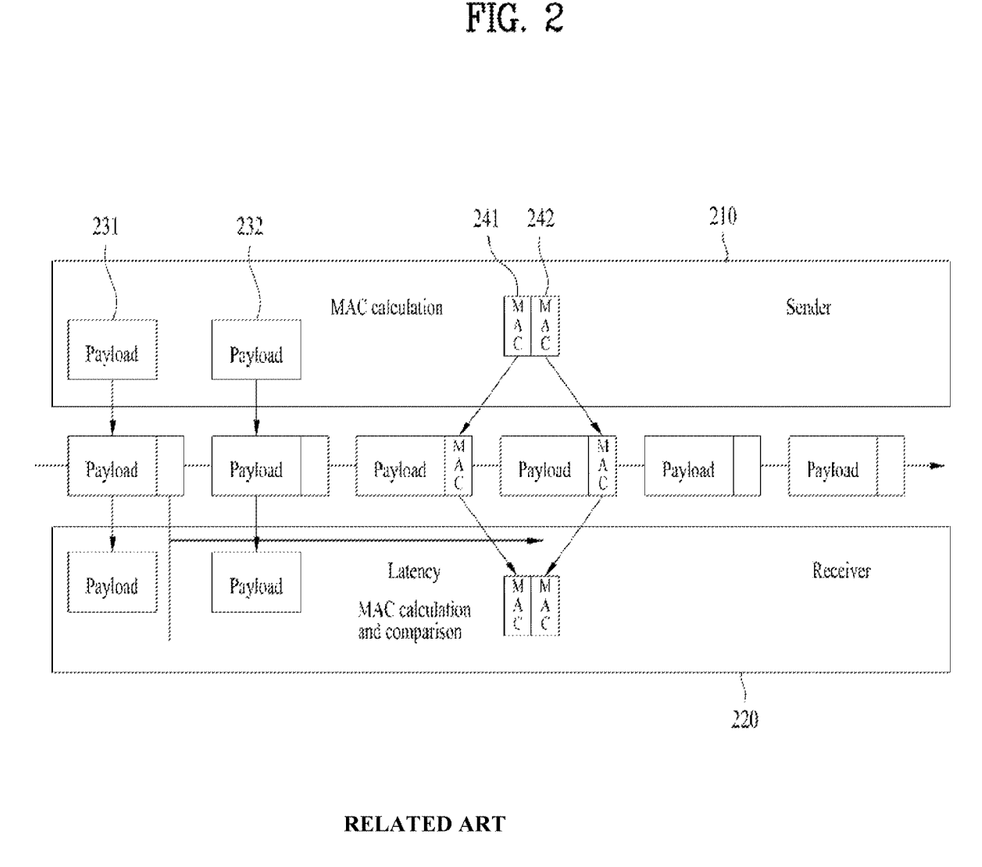
FIG. 2 is an exemplary diagram showing when latency occurs when a general MAC method is applied according to the related art.

FIG. 2 is an exemplary diagram showing latency occurring when a general MAC method is applied according to the related art. Referring to FIG. 2, when messages (e.g., payloads 231 and 232) are transmitted from a sender 210 to a receiver 220, the messages may be transmitted via different CAN frames. Thereafter, the MAC data of the transmitted messages 231 and 232 may be divided into two data 241 and 242 and the two data may be transmitted in different frames. Although the receiver 120 may receive the messages via the first two received CAN frames, since the messages may not be verified until the remaining CAN frames including the divided MACs are received, latency corresponding to three frames may occur from when the message is received via a first frame.

In summary, the MAC data for authentication may not be transmitted simultaneously with a message. Accordingly, since authentication may not be performed immediately, it may be difficult to use the MAC data for authentication of critical data which is sensitive to latency. In addition, when any one of the divided MAC data is damaged or lost, all MAC data may be used.

In order to solve the above-described problem, in one exemplary embodiment of the present invention, a method of dividing a MAC to reduce a space for the MACs in a CAN frame, performing a linear operation between divided MACs and mixing the divided MACs to generate a new MAC at a sender is proposed. In a receiver, authentication may be more efficiently performed using a relationship between the divided MACs according to the properties of the linear operation used by the sender.

Figure 3:
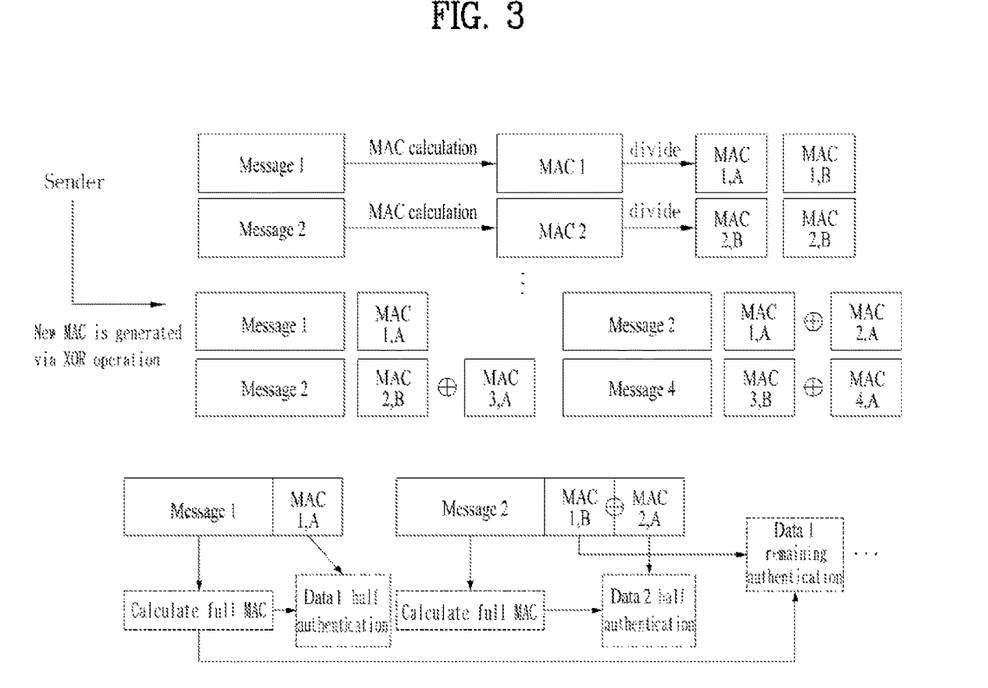
FIG. 3 is an exemplary diagram showing a sequential authentication method using a mixture of divided MAC data according to one exemplary embodiment of the present invention.

FIG. 3 is an exemplary diagram showing a sequential authentication method using a mixture of divided MAC data according to one exemplary embodiment of the present invention. Referring to FIG. 3, a sender may be configured to generate MAC 1 and MAC 2 using Message 1 and Message 2. MAC 1 may be divided into MAC(1,A) and MAC(1,B) and MAC 2 may be divided into MAC(2,A) and MAC(2,B). The sizes of the divided MACs may be about the same (e.g., half the MAC generated using the message). In a first frame, MAC(1,A) may be included as Message 1 and authentication MAC data thereof. In a second frame and frames subsequent thereto, a result of performing a linear operation (e.g., XOR) between a divided MAC (e.g., a second divided MAC) which is not included in a previous frame between the divided MACs of the MAC generated using the message included in the previous frame and a first divided MAC between the divided MACs of the MAC generated using the message included in the current frame may be included as MAC data. For example, in the second frame, a result (e.g., MAC(1,B)⊕MAC(2,A)) of performing a linear operation between MAC(1,B) and MAC(2,A) may be included as MAC data for Message 2.

When the receiver receives the first frame, MAC 1 may be generated using Message 1 and the half of Message 1 may be authenticated based on whether a first half of MAC 1 is about equal to MAC(1,A). For authentication of authentication MAC data (e.g., MAC(1,B)⊕MAC(2,A)) of the second frame, MAC(1,B) and MAC(2,A) may be calculated using Equation 1 and Equation 2 below.

$$MAC(1,A) \oplus MAC(1,B) \oplus MAC(1,A) = MAC(1,B) \quad \text{Equation 1}$$

$$MAC(1,B) \oplus MAC(2,A) \oplus MAC(1,B) = MAC(2,A) \quad \text{Equation 2}$$

In other words, MAC(1,B) which is the second half of MAC 1 may be calculated using Equation 1 and MAC(2,A) may be obtained via an XOR operation between the authentication MAC data (MAC(1,B)⊕MAC(2,A))) of the second frame and MAC(1,B). MAC(2,A) may be compared with the first half of MAC 2 calculated via Message 2 to perform authentication. Furthermore, the result of performing a linear operation between the calculated first half of MAC 2 and the calculated second half of MAC 1 may be compared with the authentication MAC data included in the second frame. Alternatively, MAC(1,B) may be obtained by modifying Equation 2 and performing an XOR operation between the authentication MAC data included in the second frame and the first half of the second message.

Accordingly, the half of Message 1 (e.g., a first half of Message 1) may be authenticated via the first frame and the remaining half of Message 1 (e.g., a second half of Message 1) and the half of Message 2 (e.g., a first half of Message 2) may be authenticated via the second frame. Since the third frame and frames subsequent thereto are similar to the second frame, for simplification of description, a repeated description will be omitted. When authentication is successful, the length of the authentication MAC data included in the frame may be halved and the length of the MAC substantially may be increased (e.g., may be doubled). In other words, security (e.g., the length of the MAC) may increase (e.g., double) using half of the authentication MAC data. Additionally, an error determination method when at least partial authentication fails in two frames, in which divided MACs are mixed and transmitted, according to one exemplary embodiment of the present invention will be described.

Figure 4:
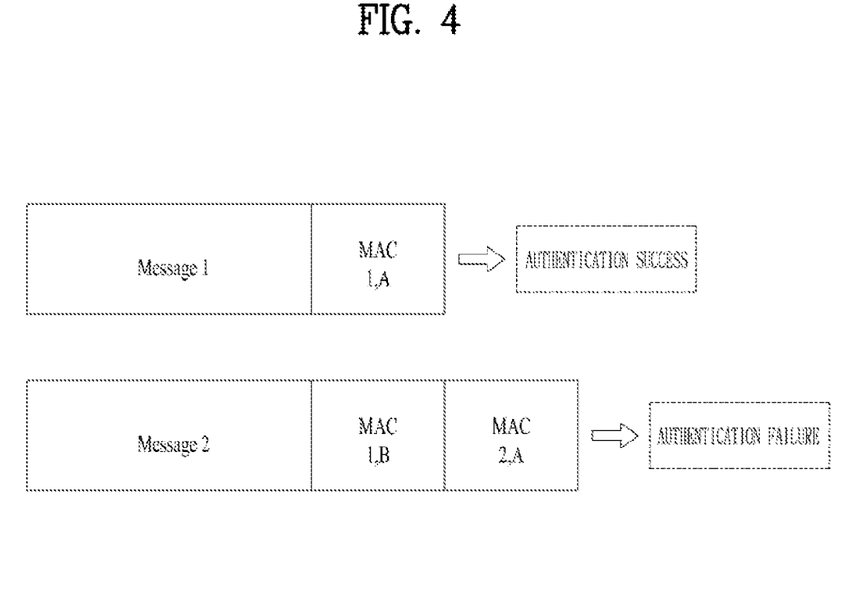
FIG. 4 is an exemplary diagram showing authentication success of two messages received by a receiver according to an exemplary embodiment of the present invention.

FIG. 4 is an exemplary diagram showing authentication success of two messages received by a receiver. When authentication fails, a determination rule based on a probability may be applied to determine authentication success or authentication failure. For example, FIG. 4, is shown under the assumption that authentication of a first frame is successful but MAC authentication of a second frame fails. In particular, an error may occur in MAC(1,B) which is the component of MAC 1 or MAC(2,A) which is the component of MAC 2. Accordingly, when authentication of the half of MAC 1, that is, MAC(1,A), is successful, a probability that an error occurs in MAC(1,B) which is the remaining half of the first MAC (e.g., a second half of the first MAC) may decrease. Accordingly, an error may be determined to occur in MAC(2,A).

The determination rule may be based on the properties of a MAC algorithm. The MAC algorithm may generate a random MAC based on an input. When a first half of the MAC is correct (e.g., is authenticated) and a second half of the MAC is wrong (e.g., is not authenticated), a problem may occur in terms of security of the MAC algorithm. In such situations, the determination rule may be defined in consideration of the properties of the MAC algorithm.

Hereinafter, the determination rule according to the present exemplary embodiment will be described in greater detail. As described above, the MAC algorithm may generate a random output with respect to input data. In particular, even when one bit of the input data changes, the values of bits that correspond to a half of the input data and located at a random location may change. Accordingly, when the size of the MAC is b bits and errors occur in one or more bits of the input data, errors may occur in b/2 bits on average. However, according to the present invention, when errors occur in one frame the frame may influence authentication MAC data of other frames transmitted thereafter.

When 0 denotes authentication success and 1 denotes authentication failure, the following errors may generally occur in the first four consecutive frames. First, "0000 . . ." may be obtained for authentication success. When authentication failure occurs in two or more consecutive frames may be as follows.

1100 . . . : first frame authentication failure
0110 . . . : second frame authentication failure
0011 . . . : third frame authentication failure
1110 . . . : first and second frame authentication failure
0111 . . . : second and third frame authentication failure
1111 . . . : first, second and third frame authentication failure As in the above result, when authentication of any one frame fails, authentication failure may be determined. Accordingly, authentication failure may indicate an error occurring in an internal communication network of a vehicle or may indicate unauthorized access. Therefore, when authentication errors occur regardless of an error pattern, a controller of a receiver may be configured to transmit a warning to an internal system. The following authentication failure may occur with a substantially low probability of 1/2b.

0100: authentication failure of first or second frame (probability of 1/2b)
0010: authentication failure of second or third frame (probability of 1/2b)
1011: authentication failure of third frame after authentication failure of first frame (probability of 1/2b)
0001: changed according to authentication result of fifth frame. Authentication failure of fourth frame in case of 00011 and authentication failure of third or fourth frame with a probability of 1/2b in case of 00010
1101: changed according to authentication result of fifth frame after authentication failure of first frame. Authentication failure of fourth frame in case of 11011 and authentication failure of third or fourth frame with a probability of 1/2b in case of 11010

Figure 5:
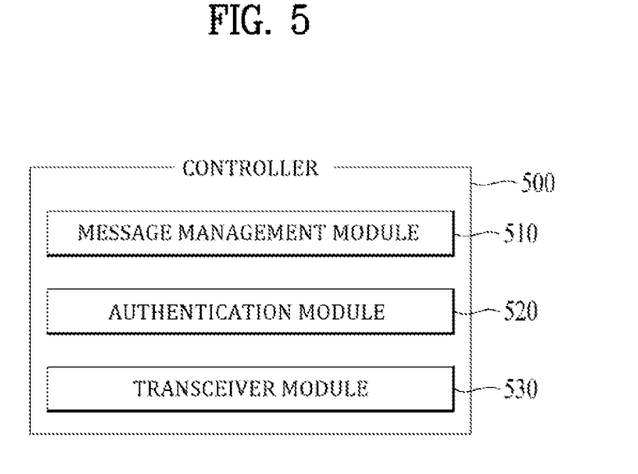
FIG. 5 is an exemplary block diagram showing the structure of an apparatus for performing authentication using a mixture of MACs according to one exemplary embodiment of the present invention.

Using the above-described authentication method using a mixture of divided MACs, a minimal region of a CAN frame may be used for authentication. Accordingly, the size of authentication MAC data included in one frame may be decreased (e.g., by half) and the effects obtained when all MACs are transmitted may be obtained by performing authentication via an operation at a receiver. In addition, the authentication method according to the present invention may provide effects similar to those obtained upon transmission of all frames unlike the method using the divided MACs shown in FIG. 2. Further, the structure of an apparatus for performing the above-described time synchronization method will be described with reference to FIG. 5. FIG. 5 is an exemplary block diagram showing the structure of an apparatus for performing authentication using a mixture of divided MACs according to one exemplary embodiment of the present invention.

The above-described method of performing authentication using the mixture of divided MACs may be performed by a CAN controller 500. This authentication method may be used in all CAN controllers over a network or only in some CAN controllers handling sensitive data.

The CAN controller 500 may include and may be configured to operate a message management module 510 configured to generate or process a message, an authentication module 520 configured to generate and manage MAC data and perform authentication using divided MACs, and a transceiver module 530 configured to perform communication using a CAN method. Although the controller is shown in FIG. 5 as including components necessary to implement the present invention only, the controller may include more components if necessary.

More specifically, when the controller 500 transmits a message to a network (e.g., the controller operates as a sender), the message management module 510 may be configured to generate a message to be transmitted to the network. The authentication module 520 may be configured to generate MAC 1 via a first message generated by the message management module 510 and generate MAC 2 via a second message. The authentication module 520 may be configured to perform a linear operation between a second half of MAC 1 and a first half of MAC 2 and generate authentication MAC data to be included in the second frame.

The transceiver module 530 may be configured to transmit the first message to the network together with the first half of MAC 1 via a first CAN frame. The transceiver module 530 may further be configured to transmit a second message to the network via a second CAN frame together with a result of performing the linear operation between the second half of MAC 1 and the first half of MAC 2. Since the transmission process after the second frame is similar to that of the second frame, a detailed description will be omitted.

When the controller 500 receives a message from the network (e.g., the controller operates as a receiver), the transceiver module 530 may be configured to receive CAN frames from the network. The authentication module 520 may be configured to calculate MAC 1 using the first message received via the first CAN frame and compare the first half of MAC 1 with authentication MAC data included in the first frame to authenticate half of the first message. Thereafter, when the second frame is received, MAC 2 may be calculated using the second message and a linear operation between the first half of MAC 2 and the second half of MAC 1 may be performed to authenticate the authentication MAC data. Alternatively, the authentication module may be configured to calculate the second half of MAC 1 via the linear operation to authenticate the remaining half (e.g., the second half) of the first message and perform the linear operation between the authentication MAC data of the second frame and the second half of MAC 1 to calculate the first half of MAC 2 to authenticate half of the second message. The messages, authentication of which has been completed, may be interpreted and managed by the message management module 510.

The above-described CAN message authentication method is not limited to the configurations of the above-described exemplary embodiments and various modifications may be made by selectively combining all or some of the above-described embodiments. It may be possible to more efficiently perform authentication in a vehicle CAN through the above-described authentication methods according to at least one exemplary embodiment of the present invention. In particular, since a mixture of divided MACs is transmitted, it may be possible to perform authentication using a minimal amount of MAC data. Since an exclusive operation between divided MACs may be performed and authentication may be performed via an operation in a receiver, effects similar to those obtained upon transmission of all MACs may be obtained.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting messages using a mixture of message authentication codes (MACs) for authentication of messages in a vehicle controller area network (CAN) including a plurality of CAN controllers equipped in a vehicle, the method comprising:
   generating, by a sending controller among the plurality of CAN controllers, a first MAC using a first message;
   dividing, by the sending controller, the first MAC into a first MAC part and a second MAC part;
   generating, by the sending controller, a second MAC using a second message;
   dividing, by the sending controller, the second MAC into a third MAC part and a fourth MAC part;
   performing, by the sending controller, a linear operation between the second MAC part and the third MAC part to generate a first authentication MAC;

transmitting, by the sending controller, the first message along with the first MAC part, but not the second MAC part, to a receiving controller among the plurality of CAN controllers;

transmitting, by the sending controller, the second message along with the first authentication MAC to the receiving controller;

authenticating, by the receiving controller, the first and second messages based on the first MAC part and the first authentication MAC; and performing, by the receiving controller, an operation in the vehicle according to the first and second messages in response to authenticating the first and second messages.

2. The method according to claim 1, wherein the dividing of the first MAC includes dividing, by the controller, the first MAC into the MAC parts having about the same size and the dividing of the second MAC includes dividing, by the controller, the second MAC into the MAC parts having about the same size.

3. The method according to claim 2, wherein the first MAC part corresponds to a first half of the first MAC, and the second MAC part corresponds to a second half of the first MAC.

4. The method according to claim 2, wherein the third MAC part corresponds to a first half of the second MAC, and the fourth MAC part corresponds to a second half of the second MAC.

5. The method according to claim 1, wherein the linear operation is an exclusive OR (XOR) operation.

6. A method of receiving messages using a mixture of message authentication codes (MACs) for authentication of messages in a vehicle controller area network (CAN) including a plurality of CAN controllers equipped in a vehicle, the method comprising:

receiving, by a receiving controller among the plurality of CAN controllers, a first frame including a first message and a first authentication MAC from a sending controller among the plurality of CAN controllers;

calculating, by the receiving controller, a first MAC using the first message;

dividing, by the controller, the first MAC into a first MAC part and a second MAC part;

comparing, by the receiving controller, the first authentication MAC with the first MAC part to partially authenticate the first message;

receiving, by the receiving controller, a second frame including a second message and a second authentication MAC from the sending controller;

calculating, by the receiving controller, a second MAC using the second message;

dividing, by the receiving controller, the second MAC into a third MAC part and a fourth MAC part;

performing, by the receiving controller, a linear operation between the second MAC part and the second authentication MAC to calculate the third MAC part;

comparing, by the receiving controller, the divided third MAC part and the calculated third MAC part to partially authenticate the second message; and performing, by the receiving controller, an operation in the vehicle according to the first and second messages in response to authenticating the first and second messages.

7. The method according to claim 6, further comprising:
performing, by the controller, a linear operation between the second authentication MAC and the divided third MAC part to calculate the second MAC part; and comparing, by the controller, the calculated second MAC part and the divided second MAC part to authenticate the first message.

8. The method according to claim 7, wherein the first MAC part corresponds to a first half of the first MAC, and the second MAC part corresponds to a second half of the first MAC.

9. The method according to claim 7, wherein the third MAC part corresponds to a first half of the second MAC, and the fourth MAC part corresponds to a second half of the second MAC.

10. The method according to claim 6, further comprising:
determining, by the controller, that the first message is authenticated when the divided third MAC part and the calculated third MAC part are identical.

11. The method according to claim 6, wherein the dividing of the first MAC includes dividing, by the controller, the first MAC into the MAC parts having the same size and the dividing of the second MAC includes dividing, by the controller, the second MAC into the MAC parts having the same size.

12. The method according to claim 6, wherein the linear operation is an exclusive OR (XOR) operation.

13. The method according to claim 6, further comprising:
comparing, by the controller, results of partially authenticating the first and second messages with a predetermined determination rule to determine a frame in which an error occurs.

14. A controller for transmitting messages using a mixture of message authentication codes (MACs) for authentication of messages in a vehicle controller area network (CAN) including a plurality of CAN controllers equipped in a vehicle, the controller comprising:

a memory configured to store program instructions; and
a processor configured to execute the program instructions, which when executed cause the processor to:
generate a first message and a second message;
generate a first MAC using the first message;
divide the first MAC into a first MAC part and a second MAC part;
generate a second MAC using the second message;
divide the second MAC into a third MAC part and a fourth MAC part;
perform a linear operation between the second MAC part and the third MAC part to generate a first authentication MAC;
transmit the first message together with the first MAC part, but not the second MAC part, to a receiving controller among the plurality of CAN controllers; and
transmit the second message along with the first authentication MAC to the receiving controller,
wherein the receiving controller authenticates the first and second messages based on the first MAC part and the first authentication MAC and performs an operation in the vehicle according to the first and second messages in response to authenticating the first and second messages.

15. The controller according to claim 14, wherein the program instructions when executed further cause the processor to divide the first MAC into the MAC parts having about the same size and divides the second MAC into the MAC parts having about the same size.

16. The controller according to claim 15, wherein the first MAC part corresponds to a first half of the first MAC, and the second MAC part corresponds to a second half of the first MAC.

17. The controller according to claim 15, wherein the third MAC part corresponds to a first half of the second MAC, and the fourth MAC part corresponds to a second half of the second MAC.

18. The controller according to claim 14, wherein the linear operation is an exclusive OR (XOR) operation.

19. A controller for receiving messages using a mixture of message authentication codes (MACs) for authentication of messages in a vehicle controller area network (CAN) including a plurality of CAN controllers equipped in a vehicle, the controller comprising:
a memory configured to store program instructions; and
a processor configured to execute the program instructions, which when executed cause the processor to:
receive a first frame including a first message and a first authentication MAC and a second frame including a second message and a second authentication MAC from a sending controller among the plurality of CAN controllers;
calculate a first MAC using the first message;
divide the first MAC into a first MAC part and a second MAC part to compare the first authentication MAC with the first MAC part to partially authenticate the first message;
calculate a second MAC using the second message;
divide the second MAC into a third MAC part and a fourth MAC part;
perform a linear operation between the second MAC part and the second authentication MAC to calculate the third MAC part;
compare the divided third MAC part and the calculated third MAC part to partially authenticate the second message; and
perform an operation in the vehicle according to the first and second messages in response to authenticating the first and second messages.

20. The controller according to claim 19, wherein the program instructions when executed further cause the processor to perform a linear operation between the second authentication MAC and the divided third MAC part to calculate the second MAC part and compare the calculated second MAC part with the divided second MAC part to authenticate the first message.

21. The controller according to claim 20, wherein the first MAC part corresponds to a first half of the first MAC, and the second MAC part corresponds to a second half of the first MAC.

22. The controller according to claim 20, wherein the third MAC part corresponds to a first half of the second MAC, and the fourth MAC part corresponds to a second half of the second MAC.

23. The controller according to claim 19, wherein the program instructions when executed further cause the processor to determine that the first message is authenticated when the divided third MAC part and the calculated third MAC part are identical.

24. The controller according to claim 19, wherein the program instructions when executed further cause the processor to divide the first MAC into the MAC parts having about the same size and divides the second MAC into the MAC parts having about the same size.

25. The controller according to claim 19, wherein the linear operation is an exclusive OR (XOR) operation.

26. The controller according to claim 19, wherein the program instructions when executed further cause the processor to compare results of partially authenticating the first and second messages with a predetermined determination rule to determine a frame in which an error occurs.

27. A method of receiving a message using a mixture of message authentication codes (MACs) for authentication of messages in a vehicle controller area network (CAN) including a plurality of CAN controllers equipped in a vehicle, the method comprising:
receiving, by a receiving controller among the plurality of CAN controllers, a frame including a message and an authentication MAC from a sending controller among the plurality of CAN controllers;
calculating, by the receiving controller, a MAC using the message;
performing, by the receiving controller, a linear operation between a second half of a MAC calculated using a message included in a previously received frame and the authentication MAC;
comparing, by the receiving controller, a result of performing the linear operation and a first half of the MAC calculated using the message to partially authenticate the message;
receiving, by the receiving controller, a next frame from the sending controller;
calculating, by the receiving controller, a next MAC using a message included in the next frame;
performing, by the receiving controller, a linear operation between a second half of the MAC calculated using the message and an authentication MAC included in the next frame;
comparing, by the receiving controller, a result of performing the linear operation and a first half of the next MAC to authenticate the message; and
performing, by the receiving controller, an operation in the vehicle according to the message in response to authenticating the message.

28. The method according to claim 27, further comprising,
comparing, by the controller, an authentication MAC included in the previously received frame with a first half of the MAC calculated using the message included in the previously received frame to partially authenticate the message included in the previous received frame, when the message included in the previously received frame is a first message.

29. The method according to claim 27, wherein the linear operation is an exclusive OR (XOR) operation.

* * * * *